US012245626B2

(12) United States Patent
Ritt et al.

(10) Patent No.: US 12,245,626 B2
(45) Date of Patent: Mar. 11, 2025

(54) APPARATUS AND METHOD FOR USE IN A FLUE-CURED BARN

(71) Applicant: BRITISH AMERICAN TOBACCO (INVESTMENTS) LIMITED, London (GB)

(72) Inventors: Daniel Augusto Ritt, Cachoeirinha (BR); Jeronimo Scremin, Cachoeirinha (BR); Valdir Milak, Cachoeirinha (BR); Irving Joseph Berger, Cachoeirinha (BR); Paula Fabiane Martins, Rio de Janeiro (BR); Vando Braz de Oliveira, Cachoeirinha (BR)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 619 days.

(21) Appl. No.: 16/300,312

(22) PCT Filed: May 4, 2017

(86) PCT No.: PCT/GB2017/051242

§ 371 (c)(1),
(2) Date: Nov. 9, 2018

(87) PCT Pub. No.: WO2017/194914

PCT Pub. Date: Nov. 16, 2017

(65) Prior Publication Data

US 2019/0110515 A1 Apr. 18, 2019

(30) Foreign Application Priority Data

May 12, 2016 (GB) ..................................... 1608317

(51) Int. Cl.
*A24B 1/02* (2006.01)
*F26B 21/00* (2006.01)
(Continued)

(52) U.S. Cl.
CPC .............. *A24B 1/02* (2013.01); *F26B 21/002* (2013.01); *F26B 21/02* (2013.01); *F26B 23/02* (2013.01); *F26B 2200/22* (2013.01)

(58) Field of Classification Search
CPC ........... F26B 21/002; F26B 21/02; A24B 1/02
See application file for complete search history.

(56) References Cited

U.S. PATENT DOCUMENTS 2,551,215 A 5/1951 Lytton
3,216,130 A 11/1965 Long et al.
(Continued)

FOREIGN PATENT DOCUMENTS

AR 029967 A 7/2003
BR 8201451 A 7/1982
(Continued)

OTHER PUBLICATIONS

Great Britian Search Report based on GB1608317.2, 4 pages, mailed Sep. 30, 2016.
(Continued)

*Primary Examiner* — Christopher M Rodd
*Assistant Examiner* — Jennifer A Kessie
(74) *Attorney, Agent, or Firm* — McKee, Voorhees & Sease, PLC

(57) ABSTRACT

The present disclosure provides a method and apparatus for use in a flue-cured barn. The apparatus comprises a combustion chamber for burning fuel; an exhaust pipe for allowing combustion gases to leave the combustion chamber; and a fan for drawing the combustion gases along the exhaust pipe away from the combustion chamber and for generating a negative pressure within the combustion chamber and exhaust pipe compared with the pressure outside the apparatus.

23 Claims, 7 Drawing Sheets

(51) Int. Cl.
*F26B 21/02* (2006.01)
*F26B 23/02* (2006.01)

(56) References Cited

U.S. PATENT DOCUMENTS

| | | | | |
|---|---|---|---|---|
| 3,233,339 | A | 2/1966 | Long et al. | |
| 4,114,288 | A | 9/1978 | Fowler | |
| 4,192,323 | A | 3/1980 | Horne | |
| 5,675,912 | A * | 10/1997 | Thompson | F26B 25/009 34/411 |
| 5,685,710 | A * | 11/1997 | Martinez Sagrera | A24B 1/02 34/212 |
| 2001/0000386 | A1 | 4/2001 | Peele | |
| 2007/0204845 | A1 | 9/2007 | Pleau | |
| 2012/0125311 | A1* | 5/2012 | Grammens | F24H 3/105 126/116 R |

FOREIGN PATENT DOCUMENTS

| | | | |
|---|---|---|---|
| CN | 1128490 | A | 8/1996 |
| CN | 2747899 | Y | 12/2005 |
| CN | 201153498 | Y | 11/2008 |
| CN | 201153499 | Y | 11/2008 |
| CN | 201335598 | Y | 10/2009 |
| CN | 201563591 | U | 9/2010 |
| CN | 201640429 | U | 11/2010 |
| CN | 102661627 | A | 9/2012 |
| CN | 103284310 | A | 9/2013 |
| CN | 203234014 | U | 10/2013 |
| CN | 203518516 | U | 4/2014 |
| CN | 203748645 | U | 8/2014 |
| CN | 204047992 | U | 12/2014 |
| CN | 204047993 | U | 12/2014 |
| CN | 204191560 | U | 3/2015 |
| EP | 2455660 | A2 | 5/2012 |
| JP | 2013231525 | A | 11/2013 |
| WO | 2015023160 | A | 2/2015 |

OTHER PUBLICATIONS

Cao Qingfeng, "Construction Equipment Control Engineering", China Electric Power Press, pp. 146-148, Jan. 2007.
Li, G., "Boiler Operator", Yanbian People's Publishing House, Jan. 31, 2002, pp. 121-122.

* cited by examiner

APPARATUS AND METHOD FOR USE IN A FLUE-CURED BARN

FIELD

The present disclosure relates to an apparatus and method for use in a flue-cured barn, and in particular for generating negative pressure in the flue-cured barn, typically as part of curing tobacco or performing other similar processes.

BACKGROUND

The post-harvest processing of tobacco leaves usually includes a step of curing to remove moisture from the tobacco leaves and to achieve desired attributes of sensorial quality. As part of the curing process, the tobacco leaves are typically located on (or suspended from) racks in a barn. Included in the barn is a heating compartment, which includes a fan, heat exchanger and a furnace. The fan is used to move air from the barn into the heating compartment, where the air is heated by the furnace and heat exchanger, and then returned into the main area of the barn. An example of such a barn used for tobacco curing is disclosed in BR 8201451A.

In such a system, hot air (typically ranging from 30-80° C.) from the furnace leaves the heating compartment and enters the barn. In the barn, the hot air causes moisture to evaporate from the tobacco leaves, as part of the curing process, whereby the air is cooled somewhat by the evaporated moisture. The cooled air is then drawn back into the heating compartment to be re-heated by the furnace.

The air is therefore re-circulated between the heating compartment and the barn housing the tobacco to be cured. This re-circulation helps to improve the efficiency of the curing process, since the cooled air returning from the barn into the heating compartment is still generally warmer than the ambient (external) air temperature. Accordingly, it requires less input of energy to heat the re-circulated air to the desired temperature for curing than it would to heat external air to this temperature.

In many implementations, the furnace burns wood as its fuel source—in many countries, this represents the most common and cost-effective energy source. In such a system (and also for other types of furnace), it is important to ensure that the recirculating air within the barn is not contaminated by smoke arising from the combustion in the furnace, since such contamination could potentially impact the tobacco which is being cured.

SUMMARY

The disclosure is defined in the appended claims.

An apparatus is provided comprising a combustion chamber for burning fuel; an exhaust pipe for allowing combustion gases to leave the combustion chamber; and a fan for drawing the combustion gases along the exhaust pipe away from the combustion chamber and for generating a negative pressure within the combustion chamber and exhaust pipe compared with the pressure outside the apparatus.

A method of generating negative pressure in a flue-cured barn is provided, the method comprising: burning fuel in a combustion chamber; providing an exhaust pipe for allowing combustion gases to leave the combustion chamber; and operating a fan to draw the combustion gases along the exhaust pipe away from the combustion chamber and to generate a negative pressure within the combustion chamber and exhaust pipe compared with the ambient pressure.

BRIEF DESCRIPTION OF THE DRAWINGS

Various embodiments of the invention will now be described in detail by way of example only with reference to the following drawings.

DETAILED DESCRIPTION

Figure 1:
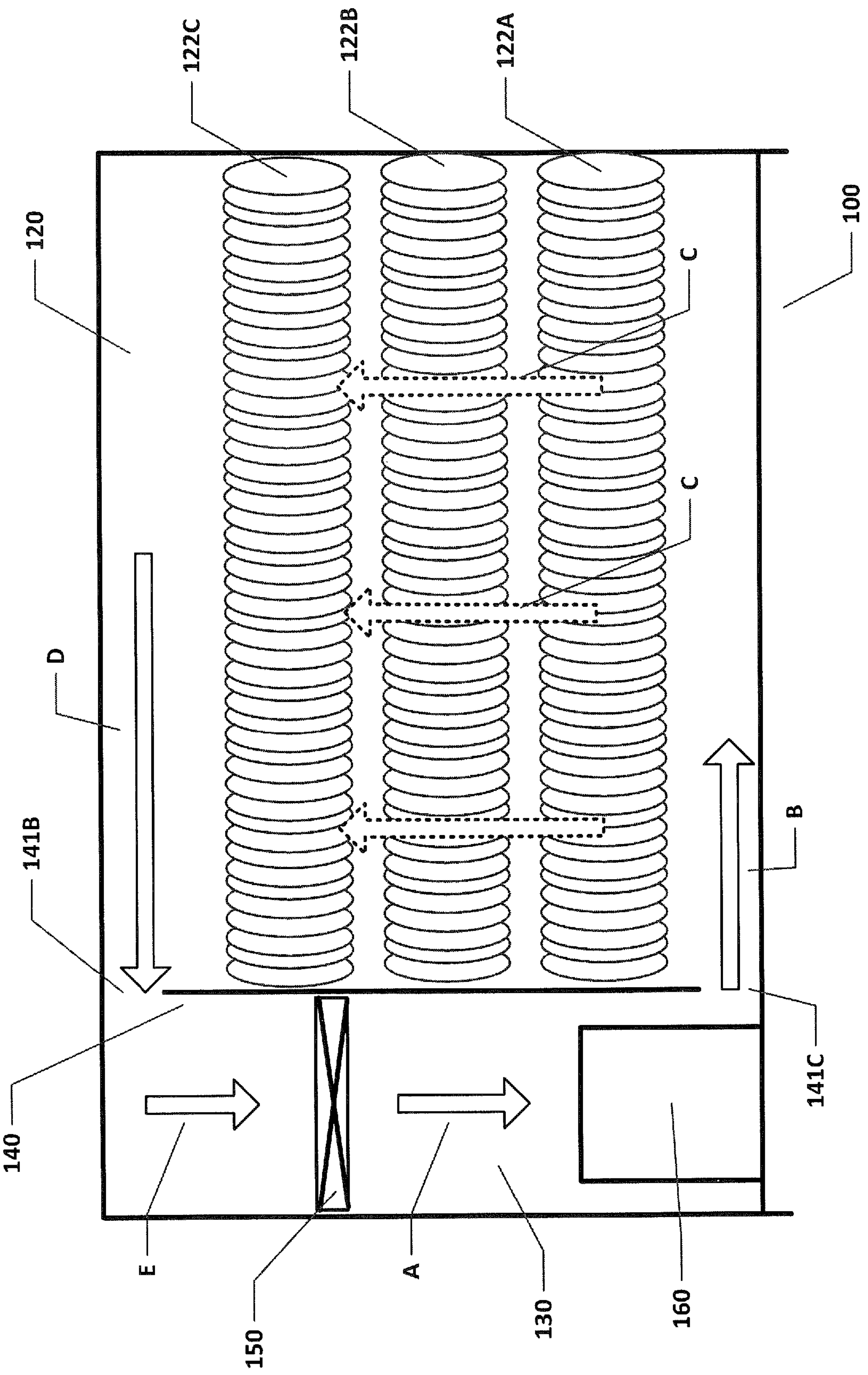
FIG. 1 is a schematic diagram of a flue-cured barn for use in a tobacco curing process in accordance with some embodiments of the invention.

FIG. 1 is a schematic drawing of a tobacco curing process in a flue-cured barn 100 in accordance with some embodiments of the invention. The tobacco curing process is performed within the flue-cured barn 100, which is divided by wall 140 into a main drying chamber 120 and a heating compartment 130. Located within the heating compartment are a fan 150 and a heater 160. The heater may be any suitable heater or heating system known to the skilled person, such as the heater shown in FIG. 2 or FIGS. 3A-3D. Located within the drying chamber are multiple racks of tobacco leaves to be cured 122A, 122B, 122C.

For a typical barn arrangement, for example as illustrated in the above-mentioned patent BR8201451A, the heater 160 is located in a front area of the barn 100, in the substantially the same location as the ventilation system, i.e. fan 150. In particular, in the implementation shown in FIG. 1, the heater 160 is sited just below the ventilator 150.

In operation, the fan 150 is used to re-circulate air within the barn 100. In particular, the fan pushes air within the heating compartment 130 towards and past the heater 160, as indicated by arrow A, such that heat is transferred from the heater to the airflow. This produces a heated airflow which travels through a suitable opening 141C in a lower portion of the dividing wall 140 into the lower portion of the drying chamber 120, as indicated by arrow B. The heated air now rises and percolates through the racks of tobacco 122A, 122B and 122C, as indicated by arrows C (shown in broken line to indicate that this airflow may be intermingled with the racks of tobacco 122A, 122B and 122C). This procedure causes the airflow represented by arrows C to draw out moisture from the tobacco, which results in a slight cooling of the airflow, plus a drying of the tobacco.

Once the airflow has reached the upper portion of the drying chamber 120, the airflow travels back into the heating compartment 130 through a suitable opening 141B in an upper portion of the dividing wall 140, as indicated by arrow D. The airflow is then drawn into the fan 150, as indicated by arrow E, and another cycle then starts as the air re-circulates within barn 100.

It will be appreciated that FIG. 1 is schematic, and there may be variations from one implementation to another, for example regarding the number and/or configuration of tobacco racks within the drying chamber 120, the construction and arrangement of the heating compartment within (or adjacent to) the barn 100, etc.

In addition, the barn 100 may also have the ability to vent a portion of the re-circulating air if the moisture content within the air becomes very high (or saturated), since this makes the air less effective at drawing moisture out from the tobacco leaves. As hot, moist, air is vented out of the barn 100, cooler, less moist air may be drawn into the barn as a replacement. This newly introduced air then has to be heated up to the operating temperature of the interior of the barn for curing the tobacco leaves. (Note that for simplicity, the outlet to vent air out of barn 100 and the inlet to introduce external air into the barn 100 are omitted from FIG. 1).

Notwithstanding such limited venting, the air used for curing the tobacco generally re-circulates within the interior of the barn, as indicated by arrows A, B, C, D and E in FIG. 1. This re-circulation of air is driven by fan 150, which draws air out of the main drying chamber 120, and into the heating compartment 130. The heating compartment is sized, e.g. by suitable placement of the dividing wall 140, so that the airflow indicated by arrow A in FIG. 1 is forced to pass relatively close to the heater 160. This helps to ensure that heat is transferred efficiently into the (re)circulating airflow, which in turn heats (cures) the tobacco in the main drying chamber 120. A heat exchanger (not shown in FIG. 1; see FIGS. 3A-3D) may be utilised to enhance the heat transfer from the heater 160 to the airflow A.

As noted above, in barns that use firewood fuel for curing tobacco (or other similar combustion fuels), there is a risk of smoke leaking into the barn, for example through cracks or holes in the pipes or furnace, or through an incorrect installation of pipes. Such leakage may potentially contaminate the tobacco leaves, which can decrease leaf quality in the barn, and may also interfere with sensory attributes of the tobacco, and so cause a loss of some of the qualitative characteristics of the tobacco. However, the heater 160 described herein may have an integrated design of one or more pieces in which a furnace 210 is joined to (integrated with) a heat exchanger by means of assembled or welded junctions. Such a construction helps to minimise the risk of leaks from connections between the furnace and the heat exchanger. Accordingly, such a heater 160 offers an effective way to improve tobacco quality, whilst retaining the ability to use an energy resource (firewood) which is currently adopted in a considerable number of countries.

While such a heater 160 can lead to reductions in contamination of the tobacco leaves that are being cured in the barn 100, it is also sensible to complement this heater with other measures to help prevent the entry of smoke into the barn 100. Accordingly, appropriate filters may be installed into any vents, ventilators, ducts or other air circulation systems involved in the curing barn 100 in order to further reduce any potential contamination.

Figure 2:
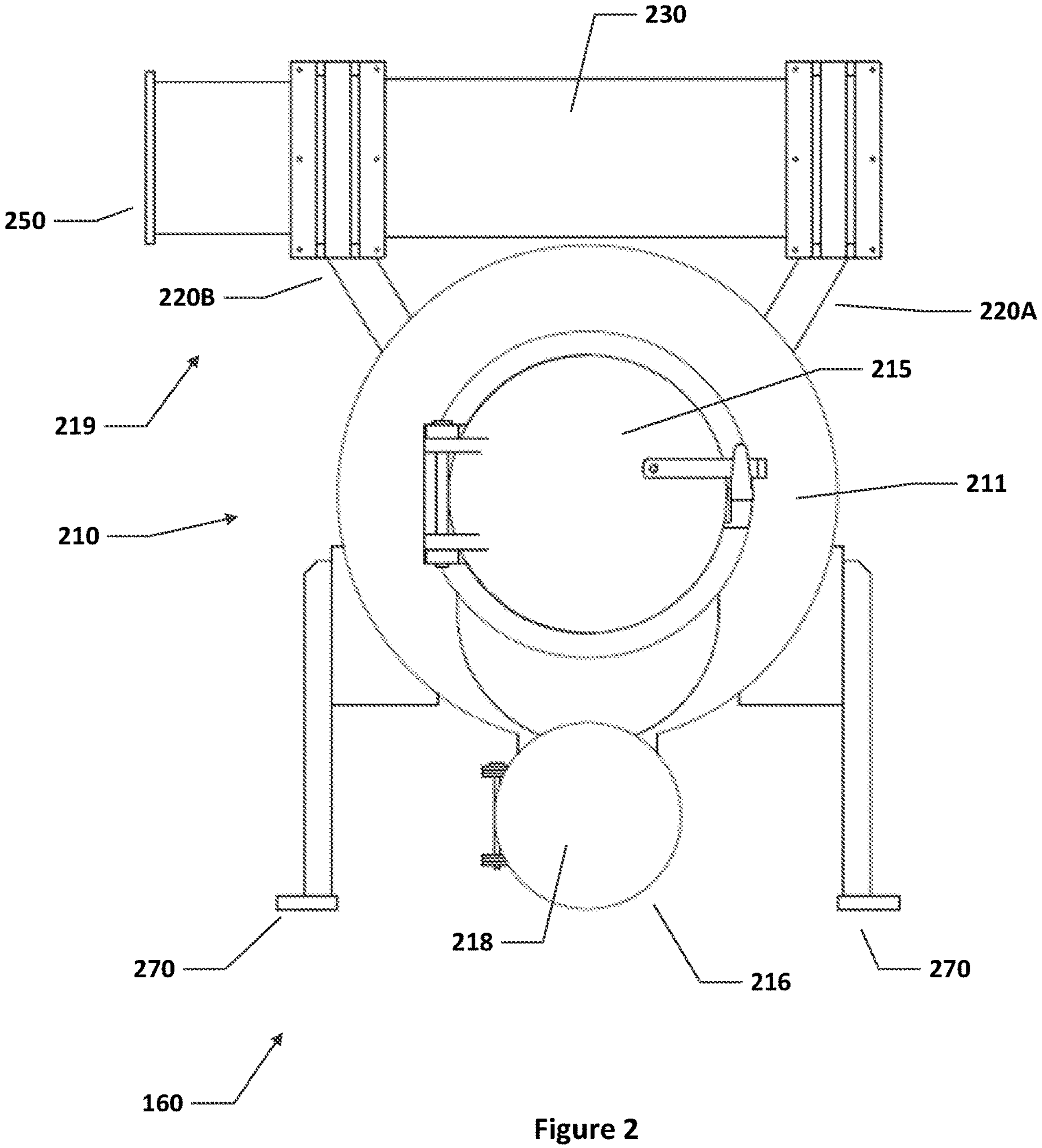
FIG. 2 is a schematic diagram of a heater for use in a flue-cured barn such as shown in FIG. 1 in accordance with some embodiments of the invention.

FIG. 2 illustrates a heater 160 such as may be used in the barn 100 of FIG. 1 in accordance with some embodiments of the invention. The heater 160 of FIG. 2 has two primary functions. Firstly, the heater 160 acts as a stove or furnace to burn fuel (typically wood) to provide a heat source. Secondly, the heater 160 acts as a (gas-to-gas) heat exchanger to help provide an efficient transfer of heat from the furnace into the circulating airflow shown in FIG. 1, thereby helping to raise or maintain the temperature inside the barn 100 as required for the curing process.

The heater 160 therefore comprises a lower portion providing a furnace or stove 210, and an upper portion providing a heat exchanger 219 located on top of the furnace. The furnace 210 (and hence the overall heater 160) is supported by four legs 270, two on each side, which may be fastened to the floor of the barn 100, for example, by screws, to retain the furnace securely in position.

The furnace includes a chamber 211 in which fuel, e.g. wood, is combusted to produce heat. The chamber has a generally cylindrical shape (similar to a pipe), where the central axis of the cylindrical shape lies approximately horizontal. At one end of the chamber (referred to herein as the front), as determined in a direction parallel to the central axis of the cylindrical shape, is a door 215. This door can be opened to allow fuel to be entered into the chamber 211.

The residue, e.g. ash, of fuel which is burnt in the chamber 211 falls into an ashtray 216 located underneath the furnace chamber 211. The ashtray also has a generally cylindrical shape, where the central axis of the cylindrical shape of the ashtray lies approximately horizontal, substantially parallel to the cylindrical axis of the chamber 211. The length of the ashtray (as measured along the cylindrical axis) corresponds approximately to the length of the chamber (also as measured along the cylindrical axis), hence the chamber and the ashtray are approximately co-extensive with one another.

The ashtray 216 is provided with a door 218 which can be used for removing ash from the ashtray. This door 218 of the ashtray is located approximately underneath the door 215 to the chamber 211. This configuration allows for easier access and configuration—e.g., ensuring that the heater 160 can be accessed from the front allows both fuel to be entered into the chamber 211 via door 215, and also ash to be removed from the ashtray 216 via door 218.

The legs 270 may support the chamber 211 such that the ash-tray 216 is held on or above the floor of the barn. The latter arrangement may be helpful, for example, to allow enhanced air circulation around the heater, and also to prevent the ashtray 216, when hot, from over-heating the floor of the barn.

The heat exchanger 219 includes two rows of pipes, 220A and 220B, one row on each side of the heater 160, and a hot air plenum 230. The pipes in both rows are uniformly sized and shaped, with a substantially circular cross-section. Each row of pipes 220A, 220B extends upwards from the chamber 211 to the plenum 230. In this way, the pipes provide a path for hot air to rise out of the furnace 210 and pass into the plenum 230. Heated gases are able to leave the plenum 230 via an exhaust tube 250. In particular, in operation the gaseous/vapour combustion products (and hot air) from the furnace pass up through the pipes 220 into the plenum 230, and from there into (and out through) the exhaust 250.

Figure 4:
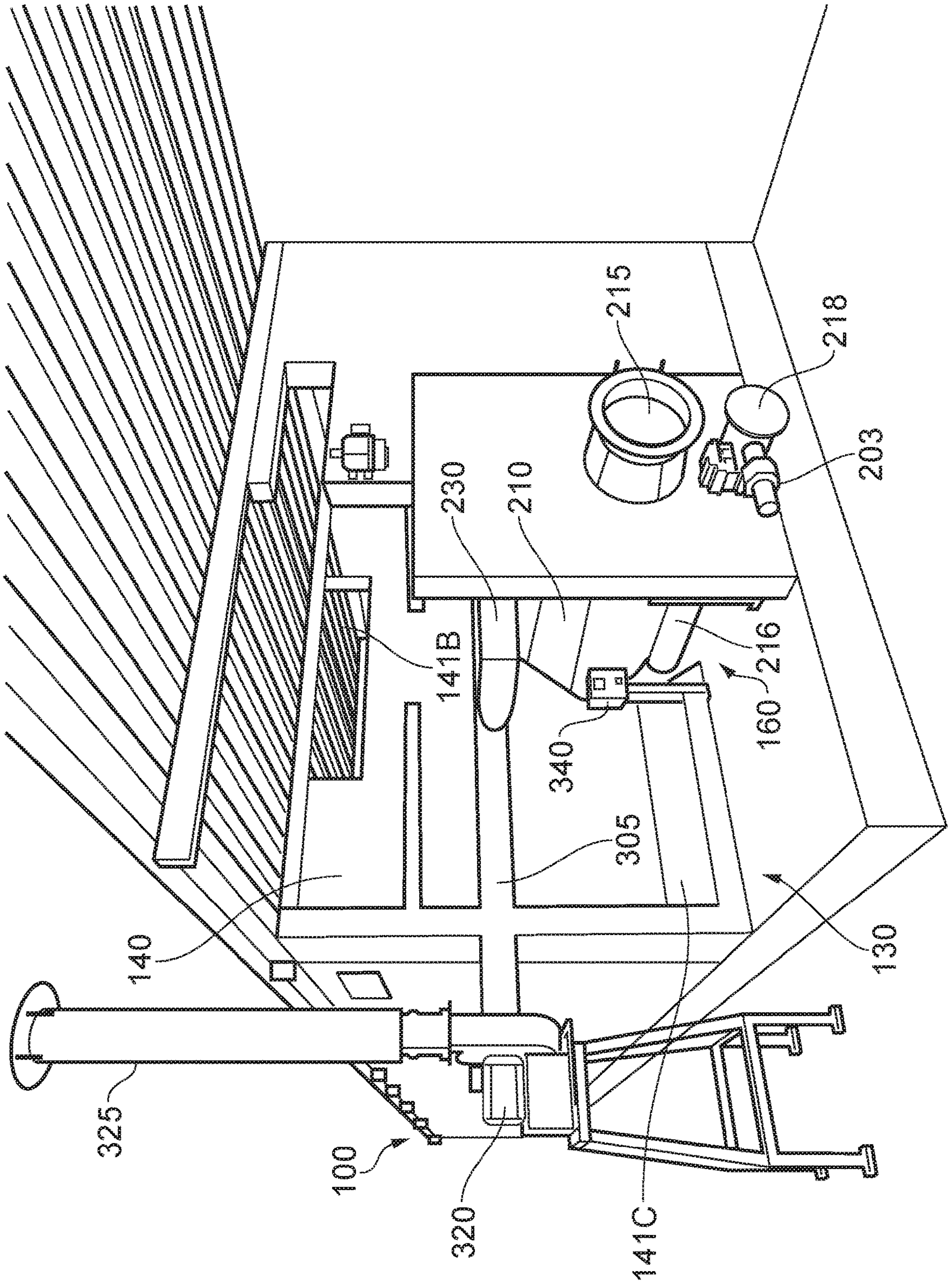
FIG. 4 is a perspective view of a flue-cured barn such as shown in FIG. 1 including a heating compartment with a heater, such as shown in FIG. 2 or FIGS. 3A-3D in accordance with some embodiments of the invention.

The ashtray is also provided with an air inlet value 203 and a small fan that connect to a pipe which leads outside the barn (this small fan and pipe are omitted for simplicity from FIG. 2, but FIG. 4 shows the air inlet valve 203). The fan draws in external air through the pipe, and this external air then passes through the air inlet valve 203 firstly into the ash-tray 216, and from there into the furnace chamber 211. Accordingly, air inlet valve 203 (plus associated fan and pipe) can be considered as a form of air injection system to support operation (combustion) within the furnace. As described in more detail below, the air inlet valve 203 may be controlled to vary the air injection rate, and hence the resulting combustion rate. Note that there is little or no risk of combustion products leaking out from this air inlet (into the barn interior), since this would require the leaking gas to flow against the pressure differential (and incoming air stream) created by the fan.

The air used for curing the tobacco generally re-circulates within the interior of the barn, as indicated by arrows A, B, C, D and E in FIG. 1. This re-circulation of air is driven by fan 150, which draws air out of the main drying chamber 120, and into the heating compartment 130. The heating compartment is sized, e.g. by suitable placement of the dividing wall 140, so that the airflow indicated by arrow A in FIG. 1 is forced to pass relatively close to the heater 160. This helps to ensure that heat is transferred efficiently from the furnace 210 into the (re)circulating airflow, which in turn heats (cures) the tobacco in the main drying chamber 120. It will be appreciated that the heat exchanger 219, including the rows 220A, 220B of pipes, is configured to help the efficiency of this heat transfer.

FIGS. 3A-3D illustrate an alternative heating system 160 such as may be used in the barn 100 of FIG. 1 in accordance with some embodiments of the invention. The heating system 160 of FIGS. 3A-3D contains a furnace or stove 210 and a heat exchanger 219. The furnace 210, which is similar to that shown in FIG. 2 (although it may, for example, not have an integrated design), is used to burn fuel such as wood to provide a heat source. The heat exchanger 219 is (for example) a gas-to-gas heat exchanger 219, to help provide an efficient transfer of heat from the furnace into the circulating airflow shown in FIG. 1, thereby helping to raise or maintain the temperature inside barn 100 as required for the curing process.

The furnace 210 (and hence the overall heater 160) is supported by four legs 270, two on each side, which may be fastened to the floor of the barn 100, for example, by screws, to retain the furnace securely in position. See for example, legs 270B-1 and 270B-2 shown in FIGS. 3B and 3D.

The furnace includes a chamber 211 in which fuel, e.g. wood, is combusted to produce heat. The chamber has a generally cylindrical shape (similar to a pipe), where the central axis of the cylindrical shape lies approximately horizontal. At one end of the chamber (referred to herein as the front), as determined in a direction parallel to the central axis of the cylindrical shape, is a door 215. This door can be opened to allow fuel to be entered into the chamber 211.

The residue, e.g. ash, of fuel which is burnt in the chamber 211 falls into an ashtray 216 located underneath the furnace chamber 211. The ashtray also has a generally cylindrical shape, where the central axis of the cylindrical shape of the ashtray lies approximately horizontal, substantially parallel to the cylindrical axis of the chamber 211. The length of the ashtray (as measured along the cylindrical axis) corresponds approximately to the length of the chamber (also as measured along the cylindrical axis), hence the chamber and the ashtray are approximately co-extensive with one another.

The ashtray 216 is provided with a door 218 which can be used for removing ash from the ashtray. This door 218 of the ashtray is located approximately underneath the door 215 to the chamber 211. The legs 270 may support the chamber 211 such that the ash-tray 216 is held on or above the floor of the barn.

Figure 3A:
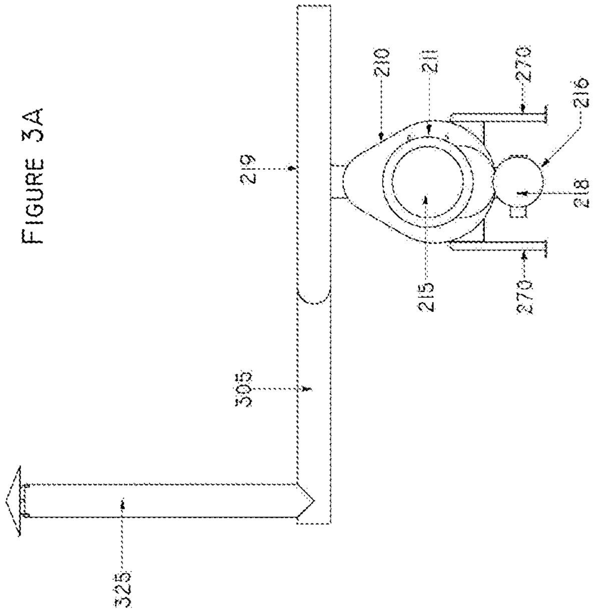
FIG. 3A is a schematic diagram of another heating system, including a furnace and a heat exchanger, which may be used in the flue-cured barn of FIG. 1 in accordance with some embodiments of the invention.
Figure 3B:
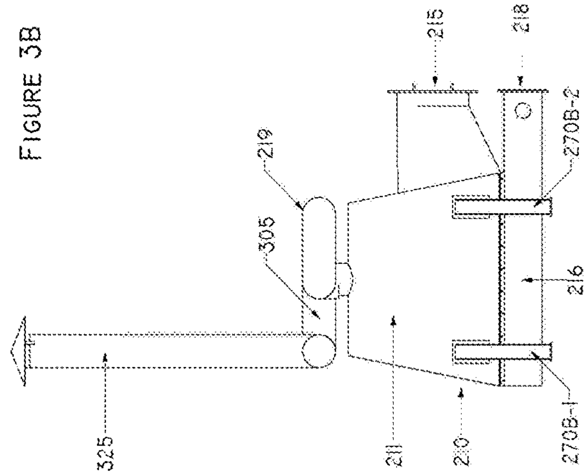
FIG. 3B is a side view of the heating system of FIG. 3A in accordance with some embodiments of the invention.
Figure 3C:
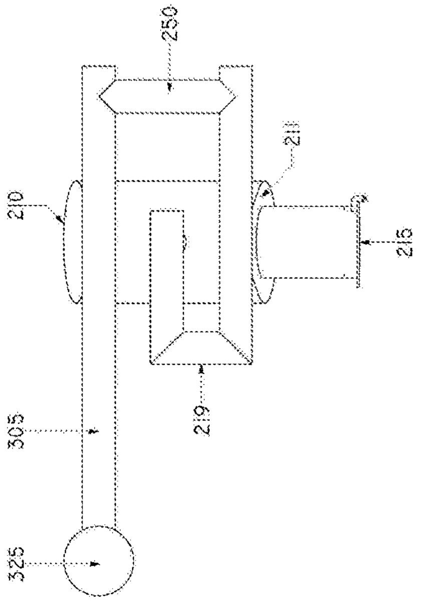
FIG. 3C is a top view of the heating system of FIG. 3A in accordance with some embodiments of the invention.
Figure 3D:
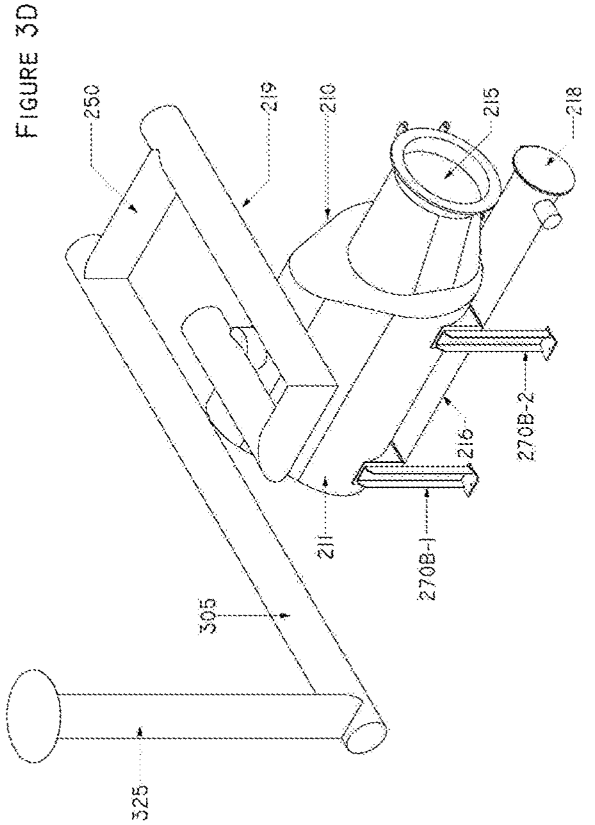
FIG. 3D is a further schematic diagram of the heating system of FIG. 3A in accordance with some embodiments of the invention.

The heat exchanger 219 is joined to the furnace 210 by means of an assembled or welded junction and means that hot air rises out of the furnace 210 and into and out through an exhaust tube 250. The exhaust tube 250 is in turn connected to a pipe 305 and a vertical chimney 325, as described in more detail below with reference to FIG. 4. It will be appreciated that the configuration and path of the heat exchanger 219, e.g. as shown in FIGS. 3C and 3D, are somewhat different from the implementation shown in FIG. 2. Note that FIGS. 2 and 3A-3D represent example implementations of the heating system 160, and the skilled person will be aware of many further possibilities.

FIG. 4 is a perspective view of barn 100 including a main drying chamber and a heating compartment 130 in accordance with some embodiments of the invention. The barn 100 of FIG. 4 can be considered as generally similar to the barn 100 of FIG. 1, although it includes additional space in the foreground, i.e. on the side of heating compartment 130 opposite to the main drying chamber. This additional space can be used, for example, to access certain portions of the heater 160, which can be considered as generally similar to the heater 160 shown in FIG. 2. Accordingly, it will be appreciated that the heating compartment 130 shown in FIG. 4 could be utilised in conjunction with a wide range of flue-cured systems (including, but not limited to, the particular barn design shown in FIG. 1), and may utilise a wide range of possible heaters (including, but not limited to, the particular design of heater shown in FIG. 2 or the heating system shown in FIGS. 3A-3D). Note also that for improved visibility of the internal space within the heating compartment 130, FIG. 4 omits fan 150, certain details of heater 160, and (partially) certain walls.

Figure 5:
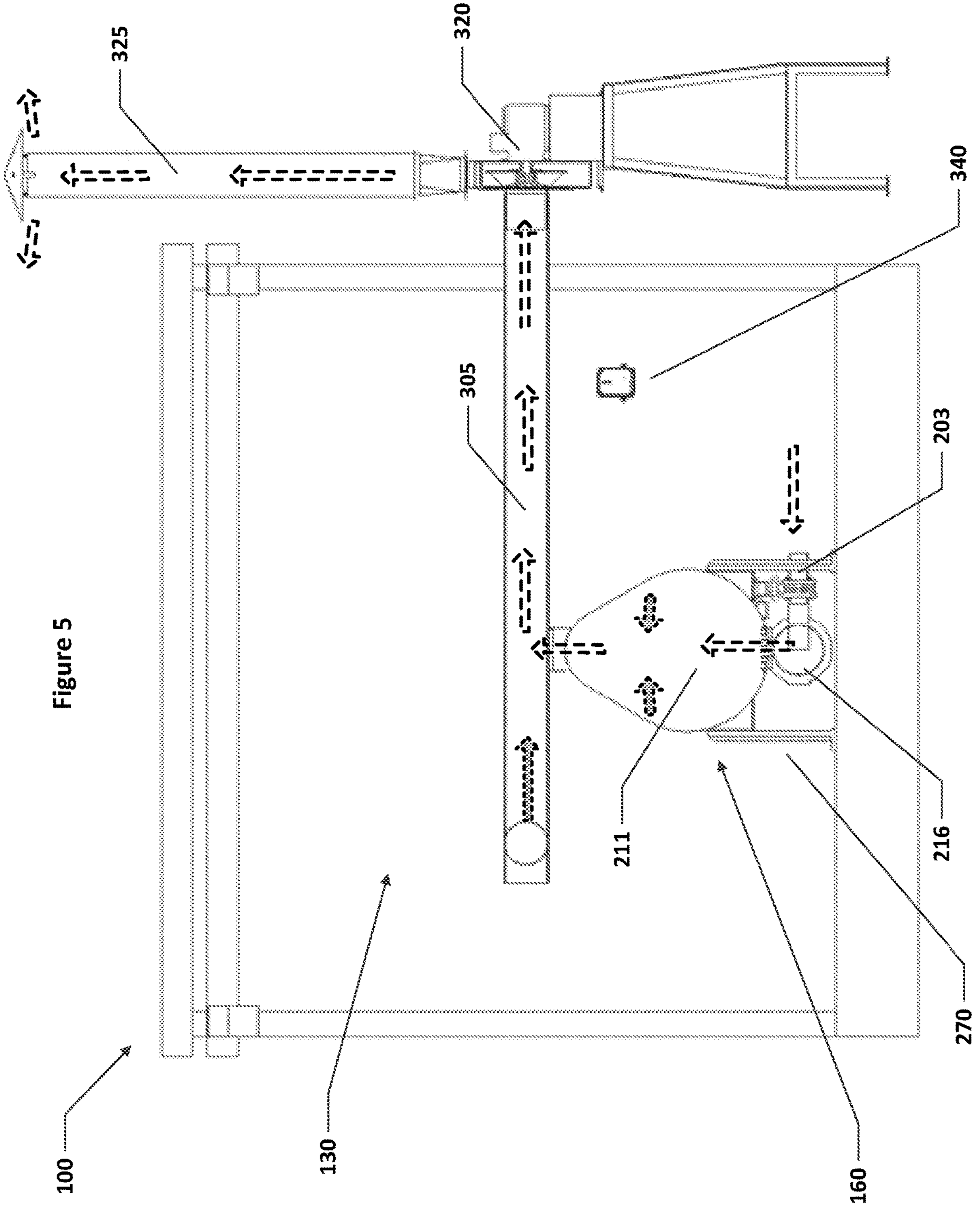
FIG. 5 is a view of the heating compartment of the flue-cured barn of FIG. 4, as seen in approximately the opposite direction from FIG. 4, in accordance with some embodiments of the invention

FIG. 5 is a view of the flue-cured barn including a heating compartment in accordance with some embodiments of the invention. In general terms, FIG. 5 can be regarded as the heating compartment of FIG. 4, but as seen from approximately the opposite direction, i.e. from the end of the heater opposite to heater door 215.

As shown in FIGS. 3, 4 and 5, a pipe or conduit 305 leads from the heater 160 out of the barn 100 to an external vertical chimney pipe 325. The exhaust tube 250 of the heater 160 connects to the pipe 305, so that the air and vapours representing the gaseous combustion products from burning fuel in the furnace 210 (plus associated smoke particles, etc) can be discharged out of chimney 325 via the heater exchanger 219, exhaust tube 250, and exhaust pipe 305. Accordingly, the exhaust tube 250 is connected, via pipe 305, to chimney 325 (or some other form of vent, see for example FIGS. 3A-3D), which is located outside the barn, so that the hot gas and vapours are vented outside the barn, rather than into the interior of the barn. Note that the location of the exhaust vent should be at a significant distance from any external air intake to provide air for recirculation within the barn (e.g. to replace air that has become saturated with moisture). One way of helping to achieve this is to have the chimney 325 of sufficient height so that the exhaust gases are dispersed or dissipated over a wide area (and away from any air inlet). Accordingly, in some implementations, the chimney 325 may be located further from the barn 100 than shown in FIGS. 4 and 5, and/or be taller than shown in FIGS. 4 and 5.

In FIGS. 4 and 5, a fan 320 is located at the junction of the exhaust pipe 305 with the chimney 325, in particular where the horizontal exhaust pipe 305 joins to the vertical chimney 325. In some implementations this fan 320 is a centrifugal fan, but other implementations may use a different form of suction device. In addition, the location of the fan within the overall system may vary somewhat according to the circumstances of any given implementation (as discussed in more detail below). The heater compartment 130 is also provided with a control panel 340, which can be used to control (automatically) the fan 320, and also the fan located at inlet valve 203 (again, described in more detail below).

The fan 320 is operable to draw gas along exhaust pipe 305 from the heater 160. In addition, fan 320 has sufficient power (suction strength) to form a negative pressure within the exhaust pipe 305, exhaust tube 250, heat exchanger 219 and furnace 210. In this context, negative pressure implies a pressure that is below the ambient pressure in the barn, which generally approximates to atmospheric pressure.

Note that existing flue-curing systems generally create a positive (not negative) pressure in the combustion chamber 211 (and connected components), due to the raised temperature and build-up of combustion gases in the combustion chamber 211. This positive pressure can encourage the leakage of the combustion gases (and associated smoke particles, etc) out of the heater into the interior of the barn, thereby leading to possible contamination of the tobacco being cured.

In contrast, the creation of negative pressure by the fan 320 within the heating system helps to reduce or eliminate the risk of smoke leaking from the furnace 210 and/or heat exchanger 219 (and associated pipes), and hence reduces the risk of potential contamination of the tobacco being cured. In particular, if there is a slight hole or other form of leakage in one of the components of the overall heating system (the furnace 210, the heat exchanger 219, the exhaust tube 250 and the exhaust pipe 305), or in a join between such components, then the pressure on the side of the hole outside the heating system is higher than the pressure on the side of the hole inside the heating system, due to the negative pressure created by the fan 320. Consequently, any air or vapour flow through such a hole will tend to be directed from the outside of the heating system (i.e. from the ambient environment of the barn) into the inside of the heating system. The same applies for any other form of opening created in the heating system. For example, if the door 215 of the furnace 210 is opened, e.g. to insert more firewood into the chamber 211, the negative pressure configuration again helps to reduce airflow out of the open door 215 (in favour of airflow into the chamber 211).

Having any such flow directed into the heating system helps to prevent smoke and other combustion products leaking or escaping out of the heating system into the interior of the barn, but rather ensures that such combustion products will generally exit the barn 100 via the expected route (through exhaust pipe 305, fan 320 and chimney 325). This therefore helps to prevent the combustion products from entering the main drying chamber 120, and hence from coming into contact with, and potentially contaminating, the tobacco which is being cured therein.

Note that chimney 325 is downstream of fan 320. Accordingly the fan will tend to push air into the chimney (in contrast to pulling air out of exhaust pipe 305). This will therefore create a positive pressure in chimney 325, in other words, the pressure inside the chimney is generally greater than ambient pressure (which will generally be atmospheric pressure). Consequently, the fan 320 is generally located outside the barn 100 (as shown in FIG. 5), or else at least immediately adjacent to the inside wall of the barn, so that the region of higher (positive) pressure created immediately downstream of the fan 320 is located outside the barn. This therefore helps to ensure that any leakage caused by such positive pressure can be vented externally, rather than flowing into the interior of the barn.

FIG. 5 illustrates schematically the flow created by fan 320. In particular, the arrows formed from dashed lines indicate the main air/vapour (including smoke) flow through the heating system, namely in through the inlet valve 203, into the furnace chamber 211, out of the top of the furnace chamber and into the heat exchanger 219 (not shown in FIG. 5), into the exhaust pipe 305, through the fan 320, up the chimney 325, and then escaping out of the top of the chimney 325. FIG. 5 also contains some arrows formed from shorted, dotted lines, and having a solid grey fill. These dotted arrows are indicative of air/vapour flow at potential points of leakage. In particular, the negative pressure created by fan 320 tends to draw combustion products from these potential leakage locations into the main air/vapour flow, as represented by the dashed arrows, whereby the combustion products end up being discharged or vented as desired by chimney 325 (rather than leaking or escaping into the interior of the barn).

It will be appreciated that existing flue-cured barn may already be provided with a heater 160, exhaust pipe 305, and chimney 325. In these circumstances, the fan 320 may be readily integrated into an existing flue-cured barn by positioning the fan such as shown in FIGS. 4 and 5. This ability to retro-fit a fan 320 into an existing flue-cured barn without having to make major changes to the overall configuration of the flue-cured barn helps to avoid significant downtime in the operation of the barn 100 and to contain costs while implementing a negative pressure system.

Figure 6:
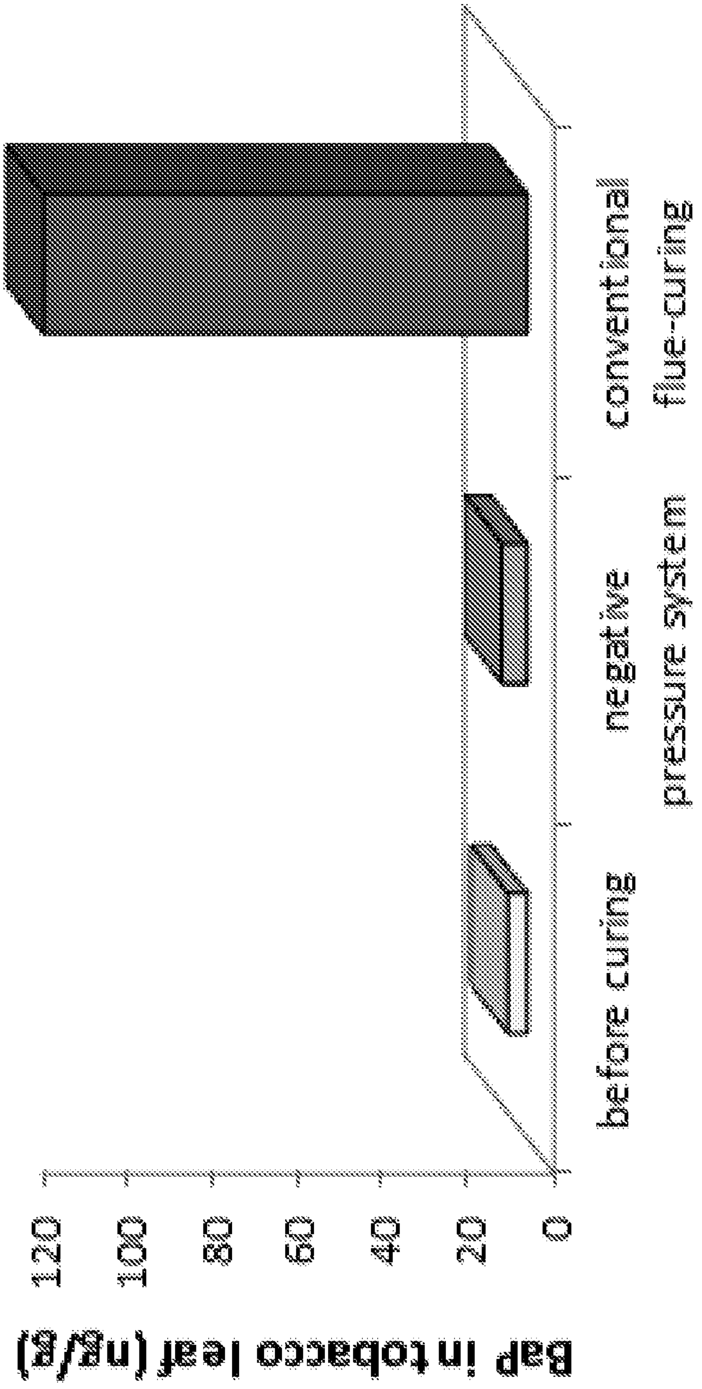
FIG. 6 is a graph illustrating in schematic form how a negative pressure system for curing tobacco, such as shown in FIGS. 1-5, can help to reduce the level of BaP (Benzo [a]pyrene) contamination found on tobacco leaves in accordance with some embodiments of the invention.

FIG. 6 is a graph illustrating in schematic form how a negative pressure system such as described herein can help to reduce the levels of a BaP (Benzo[a]pyrene) which is found on tobacco leaves. In particular, the leftmost bar represents the level of BaP on the tobacco leaves prior to curing, and it can be seen that this is a relatively low level. The rightmost bar illustrates however that conventional curing can lead to a significant increase in the level of BaP on the tobacco leaves after curing. This increase is generally attributed to combustion products (such as exhaust gases) escaping from the heater 160 used to drive the curing process into the main drying chamber 120, whereupon it may alight or settle upon the tobacco leaves. In contrast, the central bar shows that the BaP contamination of the tobacco leaves can be significantly reduced by the use of a negative pressure heater system as described herein. In particular, the negative pressure system helps to prevent combustion products (such as BaP) escaping from the heater 160 into the drying chamber 120, and hence helps to ensure that such combustion products are not able to contaminate the tobacco which is being cured in the drying chamber. It has been found that the reduction in BaP for the central bar can be as high as 95% compared with the rightmost bar, such that the resulting cured tobacco has BaP levels that are close to those found in in green leaves before curing (as per the leftmost bar).

Figure 7:
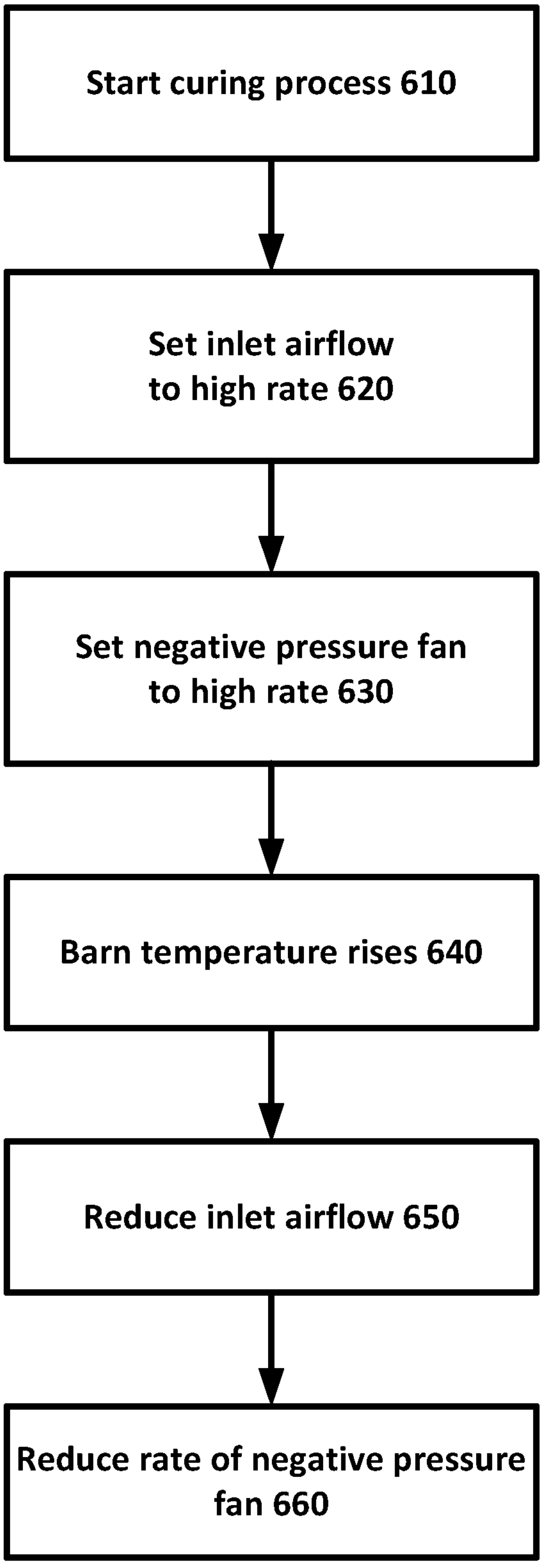
FIG. 7 is a flowchart illustrating in schematic form a process for curing tobacco, for example with the flue-curing system such as shown in FIGS. 1-5, in accordance with some embodiments of the invention.

FIG. 7 is a flowchart illustrating in schematic form a process for flue-curing tobacco, for example with the flue-curing system such as shown in FIGS. 1-5, in accordance with some embodiments of the invention. The curing process starts at 610 with the tobacco in the drying chamber 120 at a relatively low temperature. Accordingly, at 620 the air inlet valve 203 into the furnace 210 and the associated fan are set to provide a high flow of air into the furnace to support a high rate of combustion. At the same time, at 630, the fan 320 is likewise set to a high level in order to remove exhaust products, etc, from the combustion chamber at a high rate, thereby helping maintain a negative pressure within the heating system (furnace 210, heat exchanger 219, exhaust tube 250 and exhaust pipe 305), as described above.

As a consequence of the operation of the furnace, at 640 the temperature within the barn rises. In order to avoid over-heating, at 650 the air inlet valve 203 into the furnace 210 and the associated fan are set to provide a lower flow of air into the furnace to support a reduced rate of combustion (compared with the air flow and rate of combustion at 620 and 630 above). Likewise, the fan 320 is also set at 660 to remove exhaust products, etc, from the combustion chamber at a lower rate, while still maintaining a negative pressure within the heating system.

It will be appreciated that although FIG. 7 depicts a two-stage process, with a first stage at a high flow rate of air into the furnace 210, and combustion products out of the furnace 210, followed by a second stage at lower flow rate, in practice the flow rate may be reduced more gradually, to reflect a gradual increase in barn temperature. For example, the flow rate of the air inlet valve 203 and fan 320 may be reduced in a continuous fashion, or in two or more discrete (incremental stages), as the temperature rises.

In some implementations, the air inlet valve 203 may be shut once the drying chamber 120 (and/or furnace 210) has reached a desired temperature. In these circumstances, the fan 320 may still be operated to create negative pressure within the heating system (so as to continue suppressing smoke leakage from the heater 160), but at a at a reduced rate, to help avoid collapse of the fire within the furnace chamber 211.

The settings of the air inlet valve 203 and fan 320 therefore provide a dual functionality for the flue-curing process. Firstly they can be configured to produce a negative pressure within the heating system, as described above, to help reduce smoke leakage from the heater 160. Secondly, they can be configured to control the combustion rate, typically such that the combustion rate is lowered as the barn temperature increases. Note that this latter functionality, control of the combustion rate, is performed while maintaining a negative pressure within the heating system, so that the first and second functionality are performed in tandem with one another.

The settings of the air inlet valve 203 and fan 320 may be determined by the control panel 340. In some implementations, this may be performed on an automatic (or semi-automatic) basis. For example, the control panel may receive information about the current temperature in the drying chamber 120 from one or more temperature sensors in the barn. The control panel can then set the flow rate of the air inlet valve 203 and fan 320 according to the measured temperature in the barn, whereby the flow rate is generally decreased as the temperature in the barn rises.

In some implementations, the fan 320 is provided with a frequency inverter (not shown in the Figures), which is used by the control panel 340 to control the flow rate through the fan. The output from the frequency inverter is used to drive the operation (rotation) of the fan 320. The control panel 340 can send suitable commands to the frequency inverter to reduce or increase the rotation frequency of the fan, and hence decrease or increase respectively the flow rate through the fan (and the resulting pressure differential).

In an example implementation, the fan 320 is a centrifugal fan with a power rating of approximately 550 Watts and produces (generates) a pressure reduction of approximately 750 Pascals within the exhaust pipe 305, exhaust tube 250 and heat exchanger 219. This represents a negative pressure of 750 Pascals (about 0.75%) with respect to atmospheric or ambient pressure (which is typically of the order of 100,000 Pascals).

It will be appreciated that these figures are provided by way of example only, and other implementations may use a fan having a different power level, and/or produce a different level of negative pressure, depending upon the particular fan and the overall configuration of the apparatus. For example, the reduced (negative) pressure produced by the fan may be at least 0.1%, 0.2%, 0.3%, 0.5%, or 0.7% of atmospheric pressure, and may lie in a range formed from one (any) of these lower limits combined with an upper limit of no more than 1%, 2%, or 5% of atmospheric pressure.

Overall, the flue-curing approach described herein, including the provision of negative pressure and the control of the combustion rate, offers a number of benefits, including improved combustion rate for different stages of curing, reduced firewood consumption, reduced smoke leakage in barn, reduced ash deposit in ashtray 216 (and other components of the heater 160), and increased tobacco quality (reduced smoke contamination, etc).

Although the above description has focussed on certain embodiments of the heater 160, the skilled person will be aware of various potential modifications, enhancements, simplifications, etc, according to the circumstances of any given implementation. For example, the system described herein can be used to dry or cure different plant parts and/or food (not just tobacco)—e.g. grains and tea. Also, the furnace 210 might use a different heat (combustion) source rather than wood, such as liquid petroleum gas (LPG), coal, biomass, etc. In addition, in some implementations, the fan 320 might be operated at a constant rate to produce negative pressure, but without using the fan 320 to try to control the rate of combustion. In effect, such implementations perform the first functionality mentioned above of providing negative pressure, but not the second functionality shown in FIG. 7, of varying the combustion rate according to barn temperature (and/or any other relevant parameters).

The skilled person will further appreciate that the heater may include a different type of heat exchanger, for example, gas-to-liquid, depending upon how the heat is to be transferred from the furnace to the material to be heated. In addition, other techniques to help reduce or minimise smoke leakage may also be employed by the modification of the described heater 160 or applied to the conventional systems already commercially available, such as pipes junctions with flanges and clamps (e.g. for the exhaust 250), single continuous piece pipe (no junctions, e.g. original junctions welded) for the heat exchanger, and/or the use of sealing materials at such junctions, e.g. synthetic polymers as used in the vehicle industry.

In conclusion, in order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope of the claims. Various embodiments may suitably comprise, consist of, or consist essentially of, various combinations of the disclosed elements, components, features, parts, steps, means, etc other than those specifically described herein. The disclosure may include other inventions not presently claimed, but which may be claimed in future.

The invention claimed is:

1. Apparatus for use in a flue-cured barn comprising:

a combustion chamber for burning fuel;

an exhaust pipe for allowing combustion gases to leave the combustion chamber;

a fan for drawing the combustion gases along the exhaust pipe away from the combustion chamber and for generating a negative pressure within the combustion chamber and exhaust pipe compared with the pressure outside the apparatus;

a controllable air inlet valve for providing an air supply into the combustion chamber, said controllable air inlet valve configured to selectively vary a flow rate of the air supply into the combustion chamber; and a control system for controlling the combustion rate in the combustion chamber by adjusting (i) the fan for drawing the combustion gases along the exhaust pipe and (ii) the air supply through the controllable air inlet valve;

wherein the control system is configured to shut the air inlet valve once the combustion chamber or a drying chamber of the flue cured barn have reached a desired temperature and to continue to operate the fan at a reduced rate.

2. The apparatus of claim 1, further comprising a heat exchanger located between the combustion chamber and the exhaust pipe for use in heating air re-circulating within the barn, wherein the negative pressure is also generated within the heat exchanger.

3. The apparatus of claim 1, further comprising an inlet fan upstream of the combustion chamber to provide air from outside the barn through the controllable air inlet valve as the air supply into the combustion chamber.

4. The apparatus of claim 1, wherein the control system adjusts the fan for drawing the combustion gases along the exhaust pipe to operate at a slower rate and reduces the air supply through the controllable air inlet valve to decrease the combustion rate in the combustion chamber, while maintaining the negative pressure therein.

5. The apparatus of claim 4, further comprising one or more sensors for measuring temperature in the barn, wherein the control system adjusts the fan for drawing the combustion gases along the exhaust pipe and the air supply through the controllable air inlet valve based on the measured temperature.

6. The apparatus of claim 5, wherein the control system is configured to reduce the combustion rate, while maintaining the negative pressure, in response to an increase in the measured temperature.

7. The apparatus of claim 1, further comprising a frequency inverter for use by the control system for adjusting the fan for drawing the combustion gases along the exhaust pipe.

8. The apparatus of claim 1, wherein the negative pressure acts to prevent leakage of combustion gases from the apparatus into the barn.

9. The apparatus of claim 1, wherein the fan is a centrifugal fan.

10. The apparatus of claim 1, wherein the apparatus is configured to burn wood in the combustion chamber.

11. The apparatus of claim 1, wherein the negative pressure is at least 0.2% of atmospheric pressure.

12. The apparatus of claim 11, wherein the negative pressure is at least 0.6% of atmospheric pressure.

13. A barn for flue-curing, the barn including the apparatus of claim 1.

14. The barn of claim 13, wherein the fan is located adjacent to or in a wall of the barn.

15. The barn of claim 13, wherein the fan is located outside the barn.

16. The apparatus of claim 13, wherein the barn further comprises a chimney, and the fan is located between the exhaust pipe and the chimney.

17. A method of generating negative pressure in a flue-cured barn comprising:

burning fuel in a combustion chamber;

providing an exhaust pipe for allowing combustion gases to leave the combustion chamber;

operating a fan to draw the combustion gases along the exhaust pipe away from the combustion chamber and to generate a negative pressure within the combustion chamber and exhaust pipe compared with the pressure outside the apparatus;

supplying air into the combustion chamber through a controllable air inlet valve, said controllable air inlet valve configured to selectively vary a flow rate of the air supply into the combustion chamber;

controlling the combustion rate in the combustion chamber by adjusting the fan and the air supply through the controllable air inlet valve; and shutting the air inlet valve once the combustion chamber or a drying chamber of the flue cured barn have reached a desired temperature and continuing to operate the fan at a reduced rate.

18. The method of claim 17, further comprising adjusting the fan to operate at a slower rate and reducing the air supply through the controllable air inlet valve to decrease the combustion rate in the combustion chamber, while maintaining the negative pressure therein.

19. The method of claim 18, further comprising measuring temperature in the barn, and adjusting the fan and the air supply through the controllable air inlet valve based on the measured temperature.

20. The method of claim 19, further comprising reducing the combustion rate, while maintaining the negative pressure, in response to an increase in the measured temperature.

21. The method of claim 17, wherein the negative pressure acts to prevent leakage of combustion gases into the barn.

22. The method of claim 17, wherein the negative pressure is at least 0.2% of atmospheric pressure.

23. The method of claim 22, wherein the negative pressure is at least 0.6% of atmospheric pressure.

* * * * *